United States Patent [19]

Barbehenn et al.

[11] Patent Number: 5,363,134
[45] Date of Patent: Nov. 8, 1994

[54] INTEGRATED CIRCUIT PRINTHEAD FOR AN INK JET PRINTER INCLUDING AN INTEGRATED IDENTIFICATION CIRCUIT

[75] Inventors: George Barbehenn, Vancouver, Wash.; James R. Hulings, Fort Collins, Colo.; Rajeev Badyal, Corvallis, Oreg.; Ross R. Allen, Belmont, Calif.; Michael B. Saunders, Corvallis, Oreg.

[73] Assignee: Hewlett-Packard Corporation, Palo Alto, Calif.

[21] Appl. No.: 886,641

[22] Filed: May 20, 1992

[51] Int. Cl.⁵ .................................................. B41J 2/05
[52] U.S. Cl. ........................................ 347/49; 347/5; 347/59
[58] Field of Search ............... 346/140 R, 1.1; 400/175; 307/449

[56] References Cited

U.S. PATENT DOCUMENTS

| | | | |
|---|---|---|---|
| 3,852,563 | 12/1974 | Bohorquez et al. | 219/216 |
| 4,411,540 | 10/1983 | Nozaki et al. | 400/175 |
| 4,689,494 | 8/1987 | Chen et al. | 307/449 X |
| 4,695,853 | 9/1987 | Hackleman et al. | 346/140 R |
| 4,716,421 | 12/1987 | Ozawa et al. | 346/140 R |
| 4,719,477 | 1/1988 | Hess | 346/140 R |
| 4,803,500 | 2/1989 | Milbrandt | 346/140 R |
| 4,853,718 | 8/1989 | ElHatem et al. | 346/140 R |
| 4,872,027 | 10/1989 | Buskirk et al. | 346/140 R |
| 4,899,180 | 2/1990 | ElHatem et al. | 346/140 R |
| 4,902,244 | 2/1990 | Endo et al. | 439/489 |
| 4,930,915 | 6/1990 | Kikuchi et al. | 400/175 |
| 4,947,192 | 8/1990 | Hawkins et al. | 346/140 R |
| 4,963,897 | 10/1990 | Kattner | 346/140 R |
| 5,049,904 | 9/1991 | Nakamura et al. | 346/140 R |
| 5,103,246 | 4/1992 | Dunn | 346/140 R |
| 5,144,336 | 9/1992 | Yeung | 346/140 R |
| 5,235,351 | 8/1993 | Koizumi | 346/140 R |

FOREIGN PATENT DOCUMENTS

0378439 7/1990 European Pat. Off. .

*Primary Examiner*—Benjamin R. Fuller
*Assistant Examiner*—John Barlow

[57] ABSTRACT

An integrated circuit for use in the printhead of an ink jet printer includes an array circuit for heating an ink reservoir to produce a pattern of ink jets, the array circuit including a plurality of resistor cells arranged into rows and columns. A corresponding number of row and column lines are coupled to the integrated circuit array for selecting and energizing the resistor cells according to the desired printing pattern. An identification circuit integrated into the same substrate as the array circuit includes one or more programmable paths, the programmable paths corresponding and coupled to each row line. The programmable paths each include the serial combination of a programmable fuse and an active device. The opposite end of the programmable paths are coupled together at a common node, which in turn is coupled to an output circuit for providing a single output signal in response to a polling of the row lines. The identification circuit can be programmed and polled without adversely affecting or energizing the array circuit.

17 Claims, 10 Drawing Sheets

INTEGRATED CIRCUIT PRINTHEAD FOR AN INK JET PRINTER INCLUDING AN INTEGRATED IDENTIFICATION CIRCUIT

BACKGROUND OF THE INVENTION

This invention relates generally to ink jet printers and, more particularly, to an integrated circuit for the printhead of the ink jet printer, wherein the integrated circuit contains a resistor array and an identification circuit.

Referring now to FIG. 1, shown therein is a print cartridge 10 for an ink jet printer. The print cartridge 10 contains ink reservoirs and the integrated circuit (neither are shown in FIG. 1), a printhead 12, a printhead opening or "orifice plate" 11 having a plurality of nozzles for passing a plurality of ink jets, and a flexible "tab" circuit 20 that allows for electrical connection of the printhead 12 to the ink jet printer in which the cartridge 10 is installed. Thin film resistors in the integrated circuit resistor array selectively boil ink in the ink reservoir to produce a predetermined ink jet pattern. The placement of the integrated circuit resistor array is best seen in FIG. 3 and is described below.

Referring now to FIG. 2, the printhead 12 and tab circuit 20 are shown in greater detail. The tab circuit 20 is a lead frame type of flexible ("flex") circuit that generally comprises a flexible planar dielectric substrate or film having a metalization pattern formed on one surface thereof by, for example, sputter deposition and photolithographic etching. The back side of the flex tab circuit 20 that contains the metalization pattern is bonded to the integrated circuit in the print cartridge 10 using integrated circuit fabrication techniques. The front side of the flex tab circuit 20 contains ground pads 25 and interconnect pads 17 for electrical connection to the ink jet printer. Also shown in FIG. 2 is further detail of the orifice plate 11, which is surrounded by insulating adhesive beads 35 for encapsulating the interconnect conductive traces to the integrated circuit in the printhead 12. The back side of the flex tab circuit 20 is shown in greater detail in FIG. 3. The metalization pattern on the back side of circuit 20 includes conductive traces 13 separated and insulated by predetermined spaces 21. The conductive traces 13 connect the integrated circuit (shown generally at 15) to the back side of the interconnect pads 17.

The printhead 12 of the print cartridge 10 is shown in greater detail in FIG. 4 along perspective lines 4—4 of FIG. 2. The simplified cross-sectional of view of FIG. 4 reveals the placement of the integrated circuit 26, which includes the thin film resistor array, in the ink reservoir 28. The ink immediately above the integrated circuit 26 is boiled and forced through nozzles 27, forming a pattern of ink jets.

In an ink jet printer as described above and shown in FIGS. 1–4, it is desirable to have several characteristics of each print cartridge 10 easily identifiable by a controller in the printer. Ideally the data should be supplied directly by the print cartridge 10. The "identification data" provides feedback to the controller that adjusts the operation of the printer and ensures correct operation. The identified printer characteristics include, but are not limited to, ink color, architecture revision, resolution, number of nozzles 27 in the orifice plate 11, spacing between the nozzles 27, among others. In addition to the above characteristics of the print cartridge 10, it may be further desirable to characterize each print cartridge 10 during manufacturing and to supply this information to the printer. In this manner, it would be possible compensate for variations in energy supplied by the resistor array in the integrated circuit 26, ink drop volume, ink drop velocity, missing nozzles, and various other manufacturing tolerances or defects such as orifice plate 11 misalignment or non-planarity and angled orifice holes 27.

While the identification information supplied by the print cartridge 10 to the printer as described above is highly desirable, it is not desirable to add further interconnect pins 17 to the flex tab circuit 20 to carry such information. The requirements that the interconnection between the print cartridge 10 and the printer be reliable, that the print cartridge be made as small as possible, and the mechanical tolerances of the interconnect pads 17 mandate that the number of interconnect pads 17 be kept to a minimum.

Accordingly, what is desired is a method and apparatus for generating identification data directly in the print cartridge 10 to be supplied to a controller in the ink jet printer, while minimizing or even eliminating the number of additional interconnect pads 17 required to carry the identification data.

SUMMARY OF THE INVENTION

It is, therefore, a principal object of the invention to provide an identification circuit in an integrated circuit printhead of an ink jet printer while minimizing or eliminating additional interconnect pads on the print cartridge.

Another principal object of the invention is to improve the performance of an integrated circuit printhead in an ink jet printer.

According to the present invention, an integrated circuit for use in the printhead of an ink jet printer includes an array circuit for heating an ink reservoir to produce a pattern of ink jets, the array circuit including a plurality of resistor cells arranged into rows and columns. A corresponding number of row and column lines are coupled to the integrated circuit array for selecting and energizing the resistor cells according to the desired printing pattern. An identification circuit integrated into the same substrate as the array circuit includes one or more programmable paths, the programmable paths corresponding and coupled to each row line. The programmable paths each include the serial combination of a programmable fuse and an active device. The to opposite end of the programmable paths are coupled together at a common node, which in turn is coupled to an output circuit for providing a single serial output signal in response to a sequential polling of the row lines. The single serial output can be multiplexed onto an existing interconnect pad in order that the total number of interconnect pads on the print cartridge is not increased.

In the preferred embodiment, the identification signal is multiplexed onto an interconnect pad that is coupled to a thermal resistor divider, which provides analog printhead temperature information. The interconnect pad provides analog temperature information within a first voltage range and provides an identification signal in response to the polling of the row lines within a second voltage range.

In operation, the identification circuit provides information to the printer that reveals the type of printhead being used and, with appropriate programing, the type of manufacturing tolerances or defects in the printhead. Programming the identification circuit and polling the row lines does not adversely affect the resistor array or cause the resistor array to heat the ink reservoir and produce ink jets. The identification circuit is permanently coupled to the row lines and provides an identification output signal without increasing the number of interconnect pads on the print cartridge.

The foregoing and other objects, features and advantages of the invention will become more readily apparent from the following detailed description of a preferred embodiment of the invention which proceeds with reference to the accompanying drawings.

DETAILED DESCRIPTION

Figure 5:
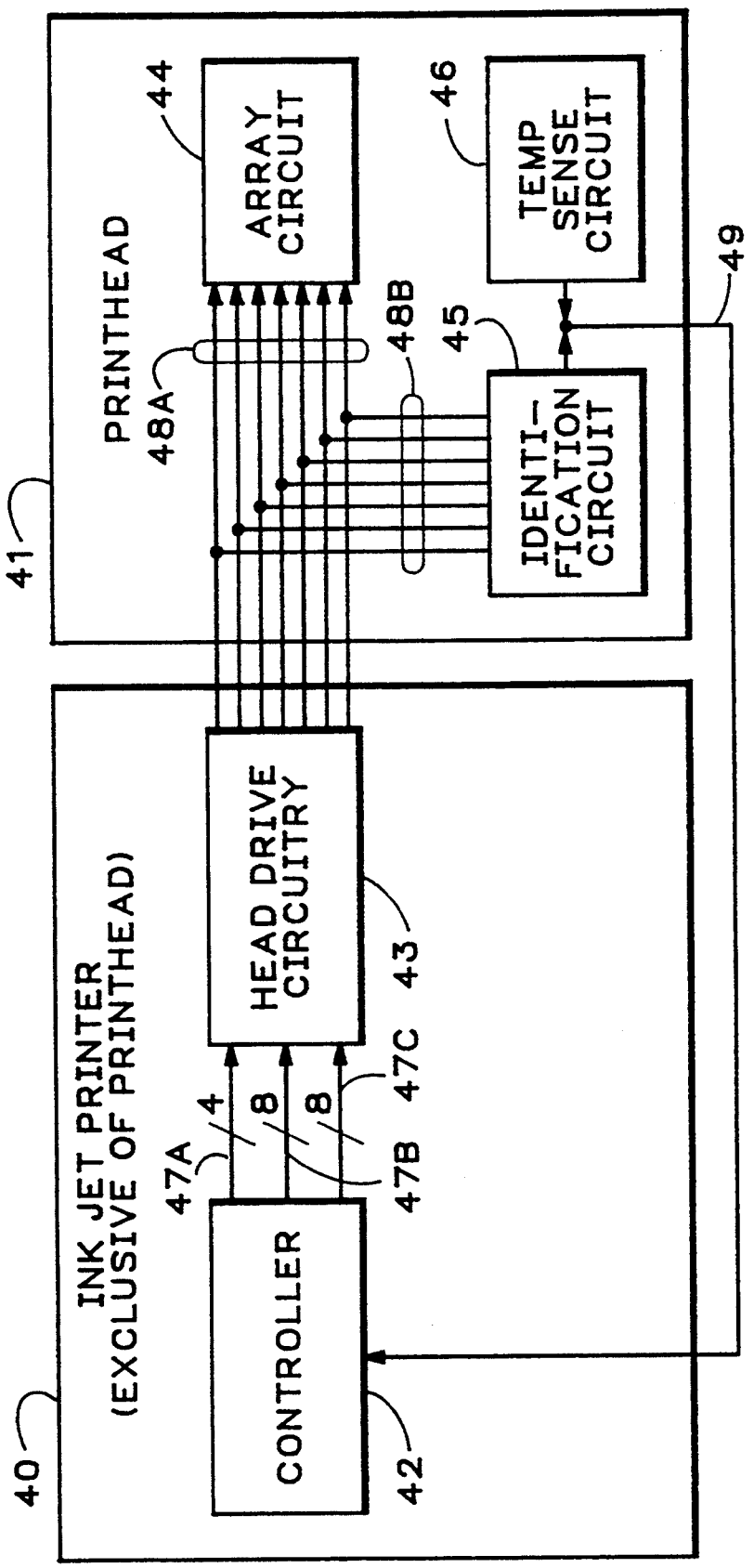
FIG. 5 is a block diagram of the ink jet printer showing the identification circuit according to the present invention and the key electrical blocks in communication with the identification.

Referring now to FIG. 5, the identification circuit 45 and key electrical circuits 42, 43, 44, and 46 are shown in block diagram form. In the ink jet printer 40 (exclusive of the print cartridge) a microprocessor controller 42 such as a Motorola MC 68000 sends digital data to the head drive circuitry 43 over digital busses 47A–47C. Typically, digital bus 47A is an encoded four bit address bus that contains the row addresses for selecting a row of resistor cells in the array circuit 44. Digital busses 47B and 47C are encoded eight bit "primitive" busses that contain the column addresses and timing information for selecting a particular resistor cell within a particular row of resistor cells. The number of row and column addresses handled by busses 47A–47C is related to the total number of resistors in the array circuit 44 that must be individually addressed. When decoded, the number must be equal to or greater than the total number of resistors in the array circuit 44.

In turn, the digital information carried by the digital busses 47A–47C is converted into analog pulses on drive lines 48A by the head drive circuitry 43. Only the address (row) drive lines 48A are shown in FIG. 5. The head drive circuitry 43 includes demultiplexing, level shifting, and output buffering to generate the appropriate analog pulses. The analog pulses are of sufficient duration and energy to heat the resistor cells in the array circuit 44 and boil the ink between the array circuit 44 and orifice plate 11.

Figure 8:
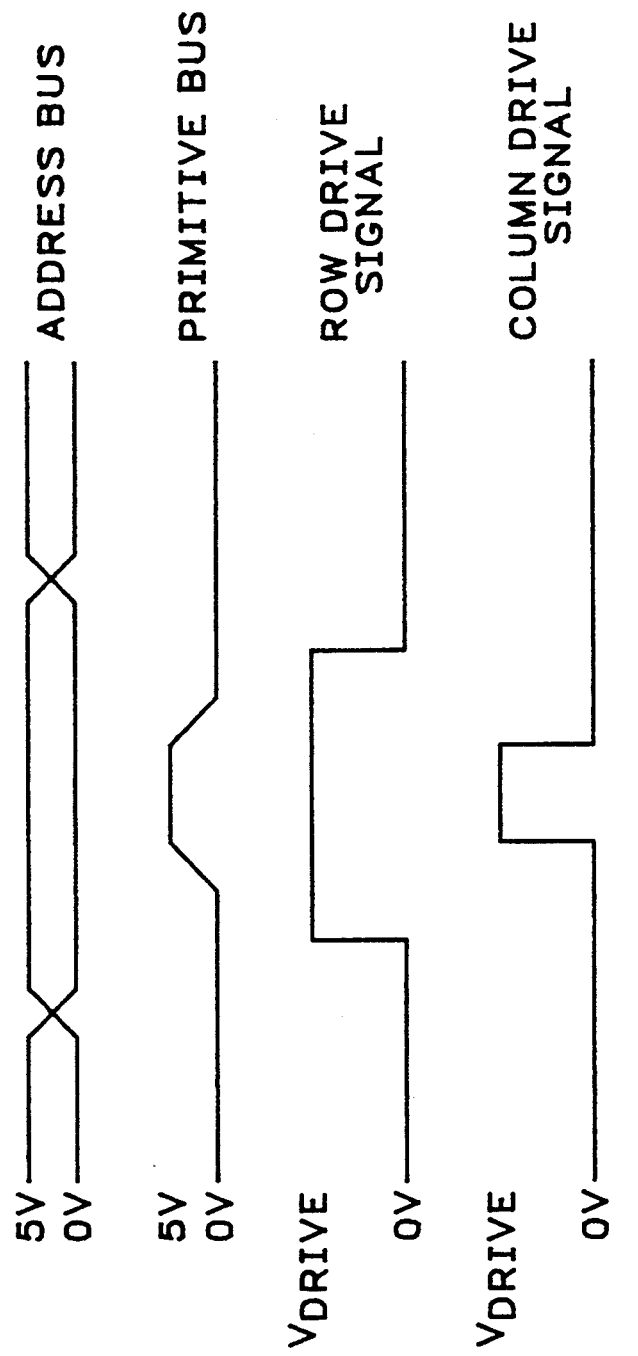
FIG. 8 is a plot of the controller bus and drive line waveforms.

The time and voltage of the pulses varies and is matched to the design of the printhead used. The waveforms for the digital busses 47A–47C and the drive lines 48A are shown in FIG. 8. The address and primitive bus waveforms are typical digital signals, switching between zero and five volts. The address bus waveform is stable for a fixed time before and after the primitive bus waveform, typically between one and seven microseconds. The row and column drive signals are typically between eight and sixteen volts, the exact voltage being dependent upon the type of resistor array circuit used.

The printhead 41 includes the resistor array circuit 44, an integrated identification circuit 45, and a temperature sense circuit 46. The analog drive pulses are received by the resistor array circuit 44 through drive lines 48A to initiate the printing action described above. Also coupled to the address drive lines 48A are corresponding input lines 48B, which are in turn coupled to the inputs of the identification circuit 45. The structure and operation of the identification circuit 45 is described in greater detail below. An integrated temperature sense circuit 46 is also integrated onto the same integrated circuit as the array and identification circuits 44 and 45, in order to supply temperature data to the controller 42. The output of the identification circuit 45 and the temperature sense circuit are multiplexed together, thus sharing a single, existing interconnection pad. The single output containing the identification and temperature data is supplied to the controller 42 through data output line 49.

Figure 6:
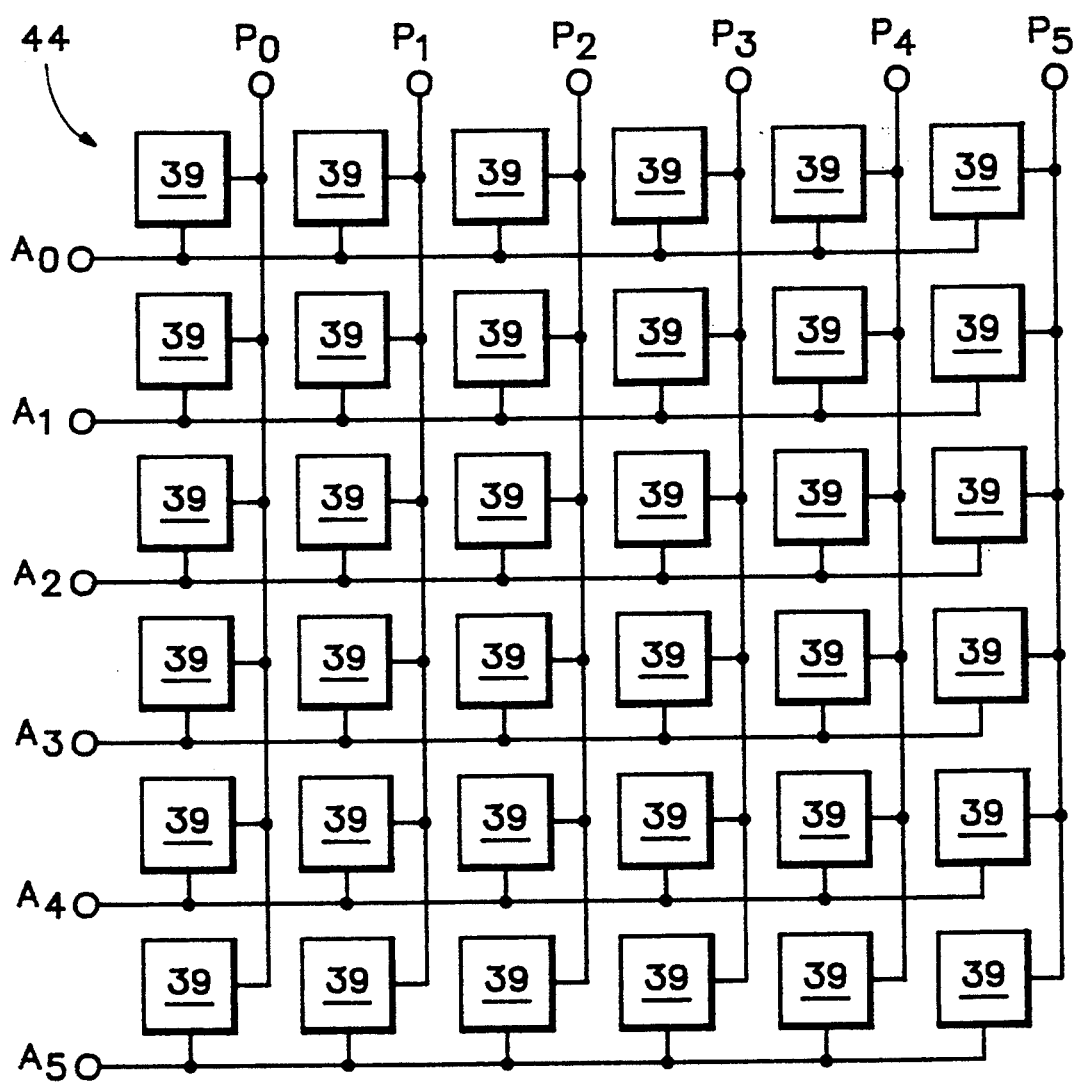
FIG. 6 is a block diagram of the resistor array circuit.
Figure 7:
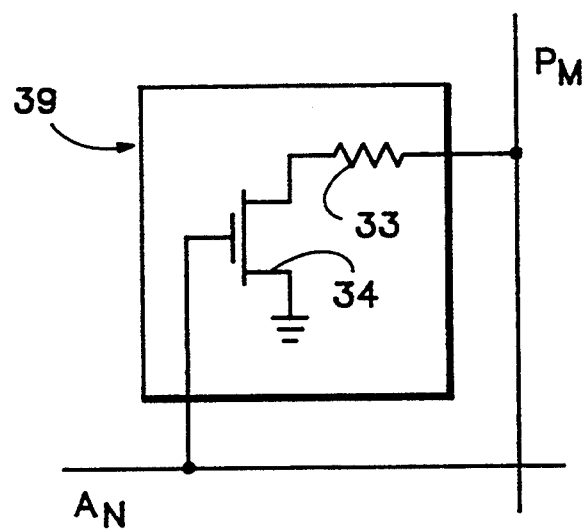
FIG. 7 is a schematic diagram of one of the resistor cells in the array circuit.

The structure of the array circuit 44 is shown in greater detail in FIG. 6. The integrated array circuit 44 for heating the ink reservoir includes a plurality of resistor cells 39 arranged in a predetermined number of rows and columns, depending upon the desired resolution of the ink jet printer. A plurality of row lines (address lines $A_0$ through $A_5$) and column lines (primitive lines $P_0$ through $P_5$) are coupled to the integrated circuit array 44 for selecting one of the resistor cells 39. Again, the total number of row and column lines is selected for illustration purposes, only. The actual number can be more or less depending upon the application. In some cases, the number of primitive lines is seven. A resistor cell 39 is shown in greater detail in FIG. 7. Each resistor cell includes a field-effect transistor 34 for controlling current flow through the resistor 33. The resistor 33 is desirably a thin film resistor such as Tantalum Aluminum (TaAl). The resistor 33 is sized to provide sufficient thermal energy to boil the ink in the ink reservoir. The field-effect transistor is coupled between one end of the resistor 33 and ground, with the gate being coupled to a representative row line $A_N$. The other end of the resistor 33 is coupled to a representative column line $P_M$. Thus, current flows from the column line $P_M$ to ground, if the corresponding row and column lines are energized.

Figure 9:
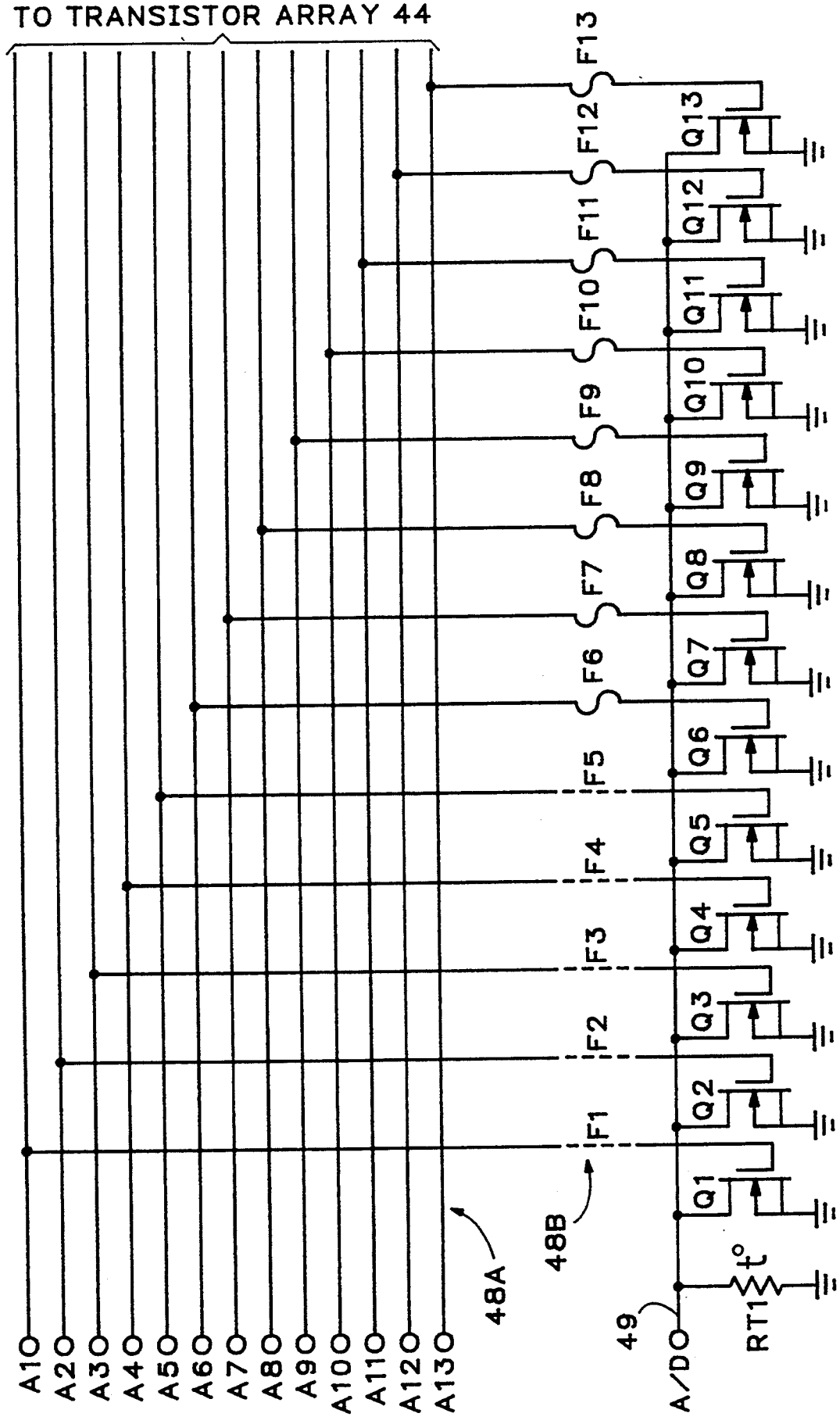
FIGS. 9–11 are schematic diagrams of three embodiments of the identification circuit of the present invention.

A schematic of the first embodiment of the identification circuit 45 is shown in FIG. 9. The address drive lines 48A are shown including individual drive lines A1 through A13. The number of drive lines is, of course, dependent upon the number of rows of resistor cells 39 in the array circuit 44. The exact number in FIG. 9 is for illustration only. The identification circuit 45 further includes a plurality of programmable paths corresponding and coupled to each address (row) line 48A through input lines 48B. The programmable paths each include the serial combination of a programmable fuse and an active device.

In FIG. 9, the programmable fuse is either mask programmable, a fusible link, or other type of fuse in series with the gate of a field-effect transistor. Fuses F1–F5 are typically mask programmed at the time the print cartridge 10 is manufactured. Programmable fuses F6–F13 are fabricated out of polysilicon or other suitable materials and are typically programmed by a programming circuit (seen in FIG. 9B and discussed below) after the cartridge is manufactured. The active device is a typically a field-effect transistor (Q1–Q13). The programmable path in series with the gates of transistors Q1–Q13 are programmed to make a connection to the address lines 48A to establish a digital code. The digital code generated by transistors Q1–Q13 provides information to the ink jet printer as to the type of print cartridge that is installed and other information related to manufacturing tolerances and defects. In FIG. 9, fuses F1–F5 are depicted in an undefined (either logic one or zero) logic state, and fuses F6–F13 are depicted in an unprogrammed state (either all logic one or logic zero, depending upon the convention chosen.)

The second end of the programmable paths (in FIG. 9 the second end of the programmable paths is the drain of transistors Q1–Q13) are coupled together at node 49. Node 49 forms a single output signal in response to a polling of the address lines 48A. Node 49 is a coupled to an output circuit, which is simply a pull-up resistor (not shown in FIG. 9) coupled to a positive power supply in the ink jet printer.

Figure 9A:
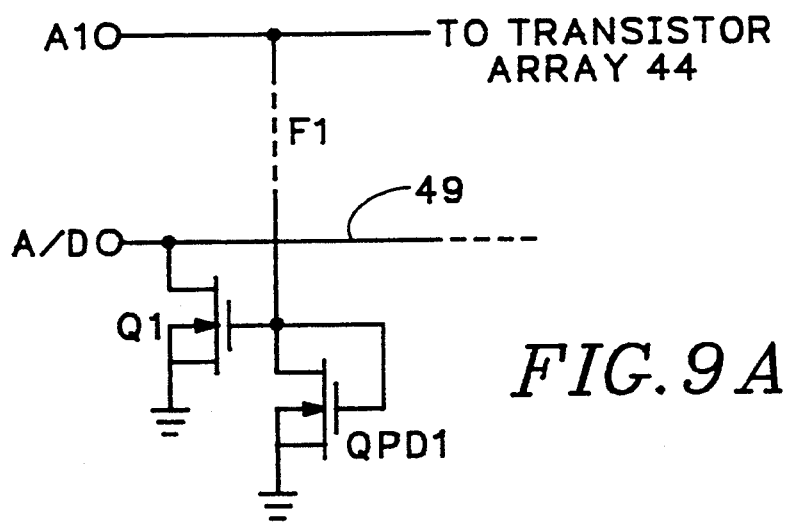
FIGS. 9A and 9B are schematic diagrams of pull-down and programming circuits suitable for use in the embodiment of FIG. 9.
Figure 9B:
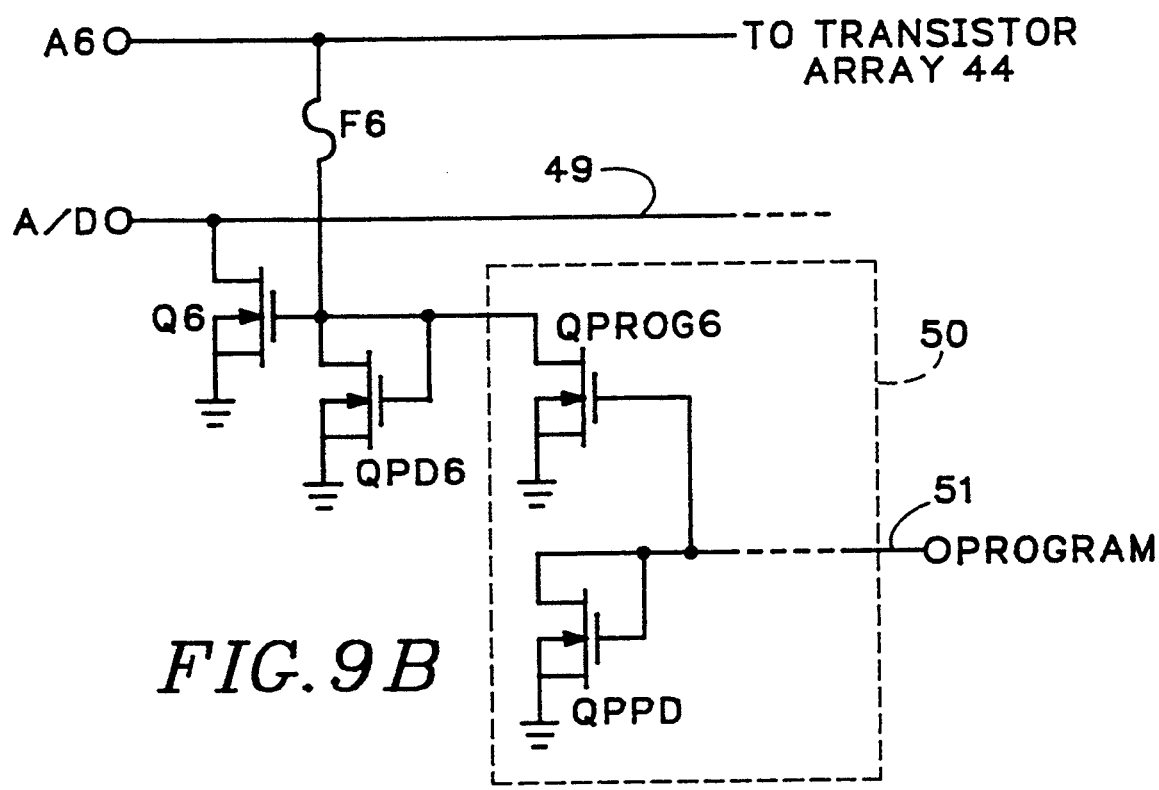

FIGS. 9A and 9B show greater detail of the identification circuit 45. In FIG. 9A, a pulldown transistor QPD1 is shown having a drain and gate coupled to the gate corresponding transistor Q1. The source shorted of transistor QPD1 is coupled to ground. While only one such pulldown transistor is shown, each transistor Q1 through Q13 includes a corresponding pulldown transistor. The pulldown transistor is necessary to pulldown the gate of transistor Q1 through Q13 if the corresponding fuse is opened. If the pulldown transistor is omitted, the gate of transistors Q1 through Q13 will float, placing the transistor, and A/D 49 node, in an indeterminate logic state.

FIG. 9B shows additional circuit detail for programming fuses F6 through F13. Since fuses F6 through F13 are not mask-programmable, an additional current pulse from a programming circuit is used to program the fuse. Programming circuit 50 has an input 51 designated PROGRAM and an output coupled to the gate of transistor Q6. Programming circuit 50 includes a programming transistor QPROG6 and a pulldown transistor QPPD. The drain of transistor QPROG6 forms the output of the programming circuit 50. The gate of transistor QPROG6 is coupled to the drain and gate of transistor QPPD to form the input 51 of programming circuit 50. The sources of both transistors are coupled to ground. Although only one programming transistor QPROG6 is shown coupled to the gate of corresponding transistor Q6, there is one programming transistor for each transistor Q6 through Q13 associated with a fuse that must be programmed with a current pulse. Thus, for the embodiment of FIG. 9, the programming circuit will have eight outputs and eight programming transistors QPROG6 through QPROG13. The gates of each of the programming transistors is coupled to the common input line 51 for receiving the PROGRAM input signal. Only one pulldown transistor QPPD, however, need be used, regardless of the number of outputs. The pulldown transistor QPPD assures that the all outputs of the programming circuit 50 are off when the PROGRAM input signal is low or an open circuit.

Figure 1:
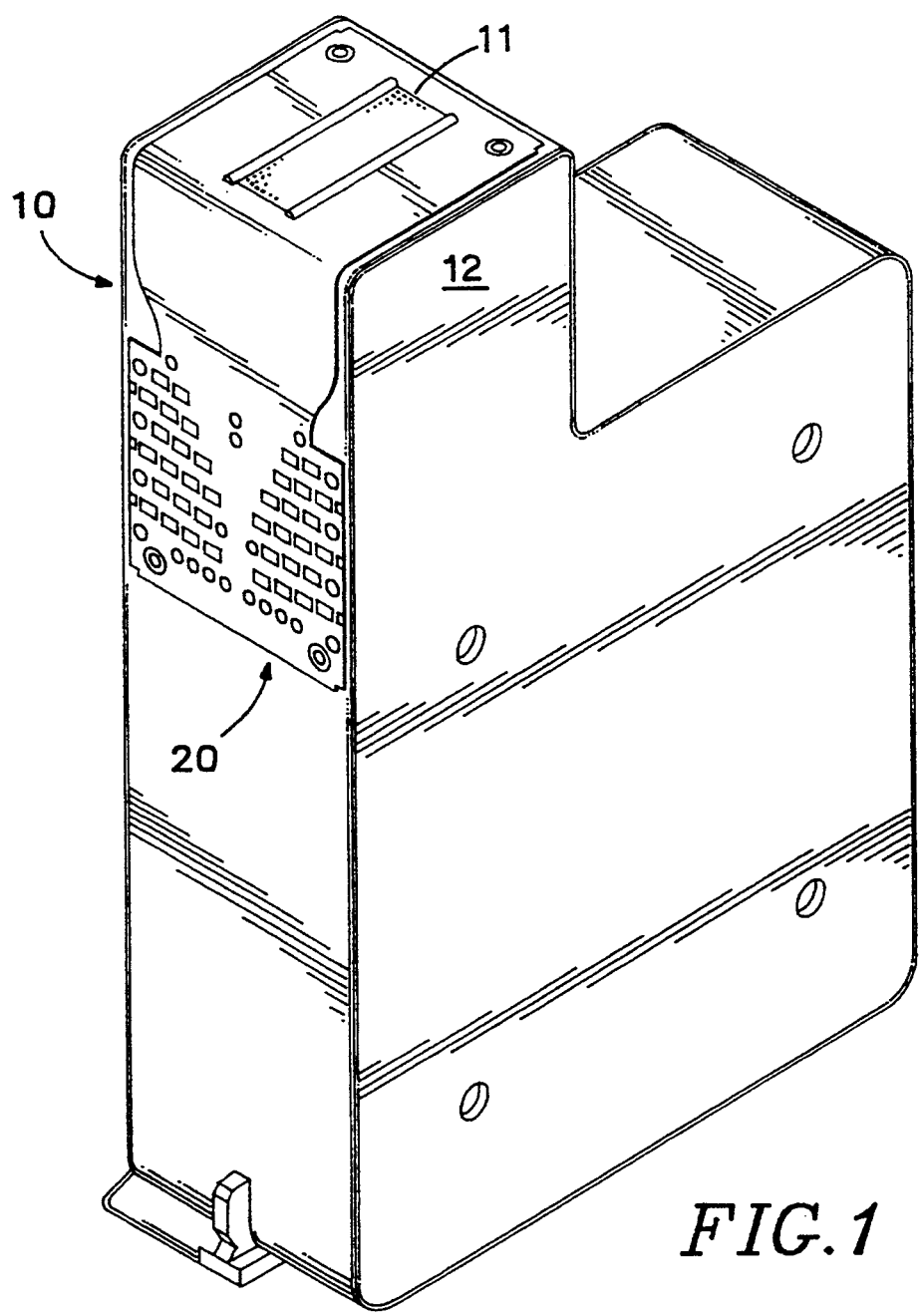
FIGS. 1–2 are perspective views of an ink jet print cartridge including a flexible interconnect flex tab circuit.
Figure 4:
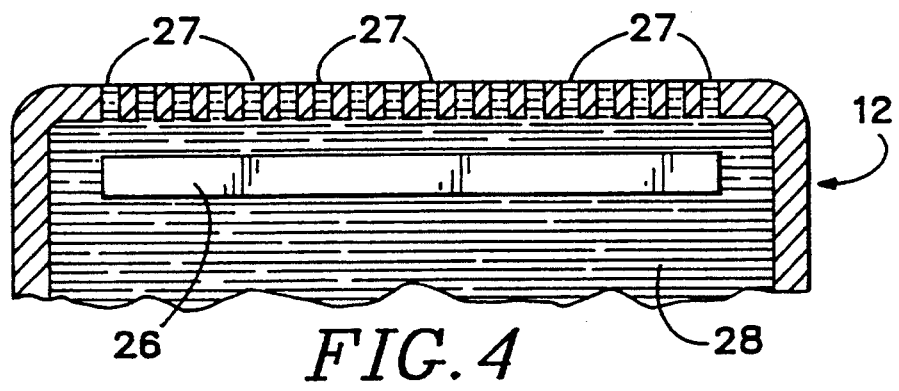
FIG. 4 is a cross-sectional view of a printhead along perspective lines 4—4 of FIG. 2.
Figure 2:
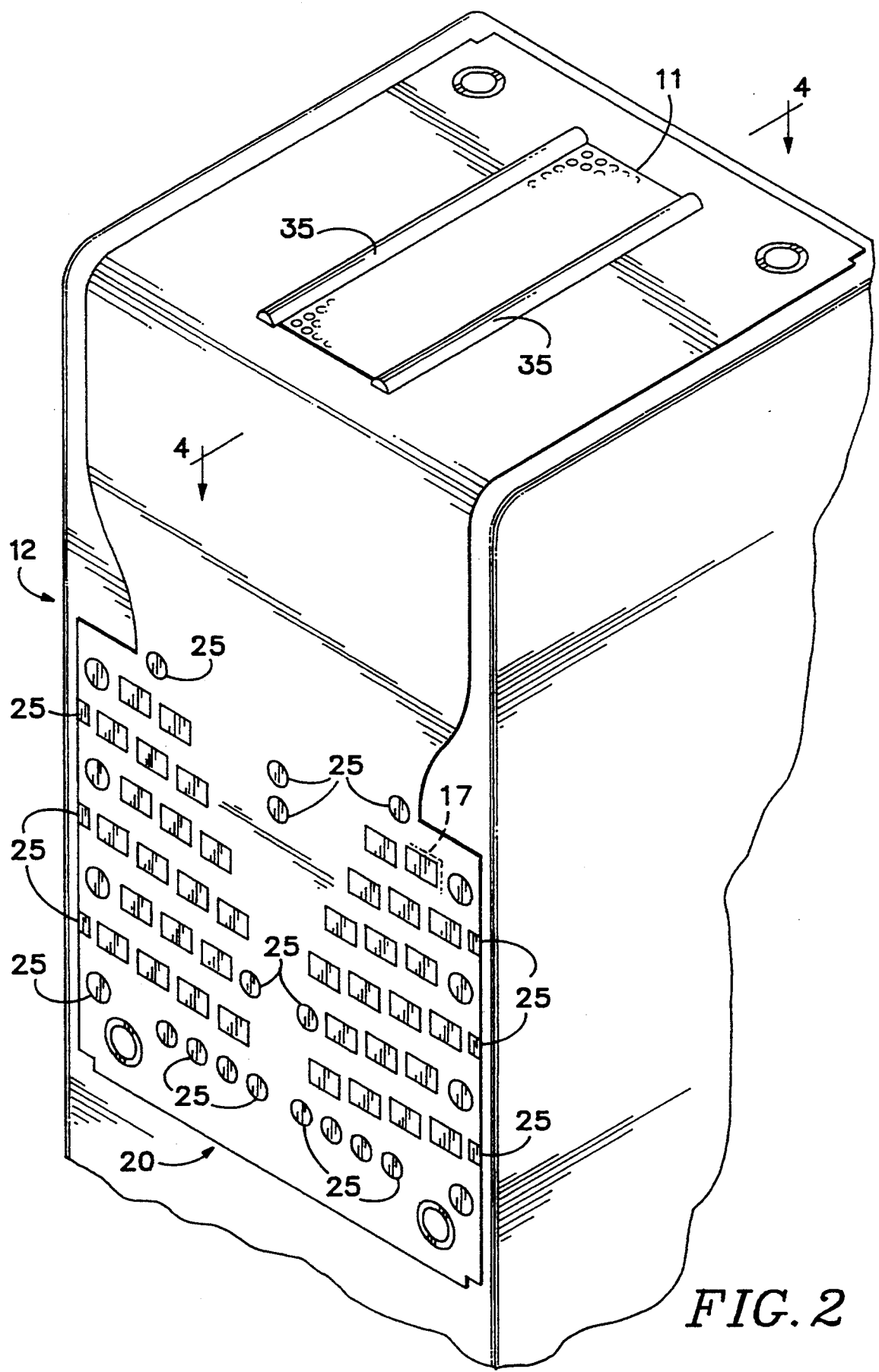
Figure 3:
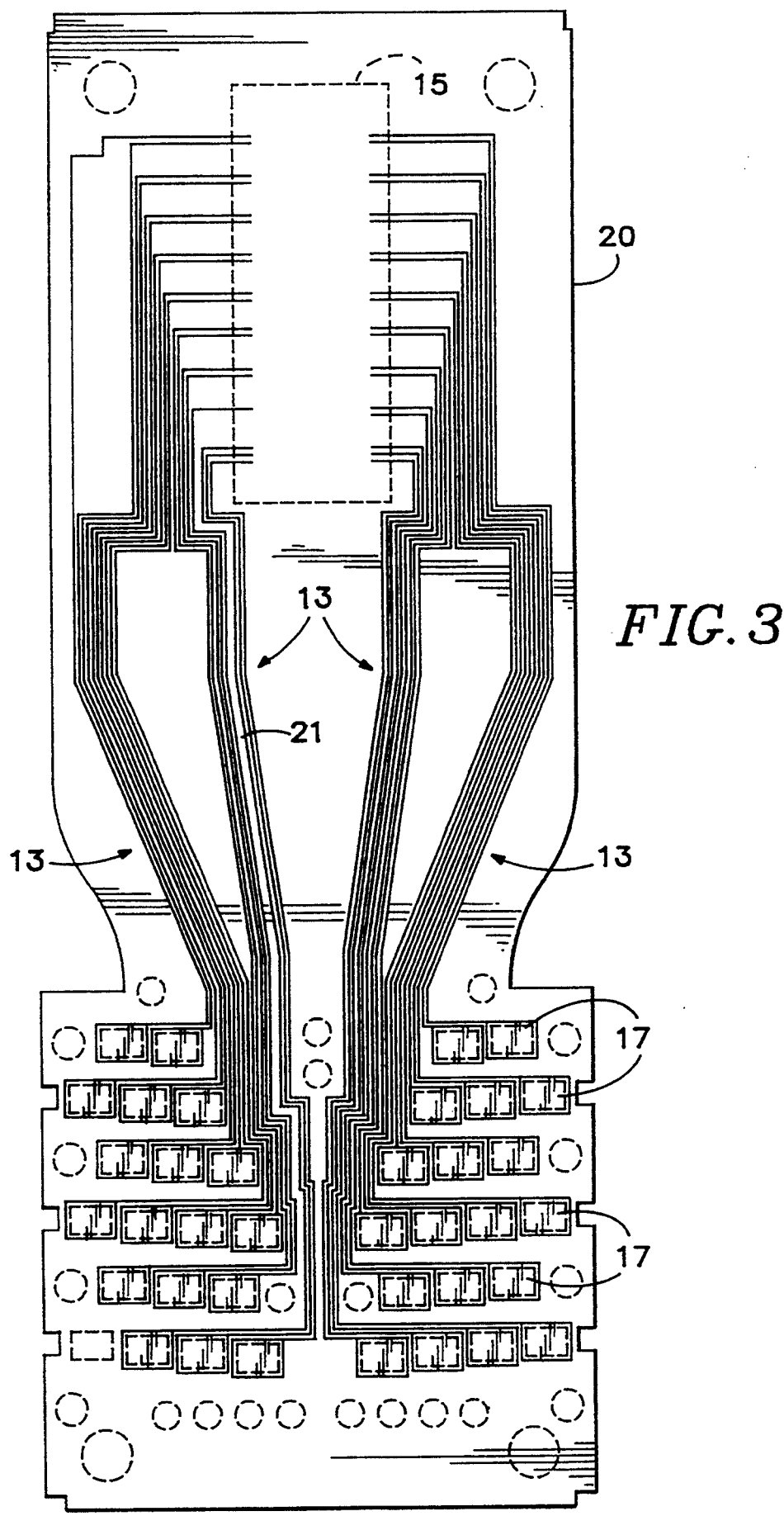
FIG. 3 is a plan view of the back side of the flex tab circuit showing a metalization pattern.

In operation, the programming circuit 50 is activated by supplying a logic high PROGRAM signal on input line 51. By selecting a particular address line $A_N$, an extra current flows through the corresponding programming transistor sufficient to program (open) the fuse. Fuses coupled to unselected address lines remain unprogrammed (short circuited). It is important to note that, while input line 51 represents an extra input pin for the printhead, it is not necessary that input line 51 be grouped with the existing printer connector pads (best seen in FIG. 2). The extra input line connector pad can be placed anywhere on the printhead. A special programming fixture can be built to interface with the extra connector pad. It may desirable to place the programming connector pad away from the main group of printer connector pads to avoid an inadvertent entry into the programming mode.

Referring back to FIG. 9, if a programmable path is programmed to form a connection between an address line $A_N$ and the gate of the corresponding field-effect transistor $Q_N$, a polling of the address line turns on the transistor and pulls node 49 low. Alternatively, if a programmable path is programmed to form an open circuit between an address line and the gate of the corresponding field-effect transistor, a polling of the address line has no effect on the turned off transistor, since the gate is pulled low, and node 49 remains high. The signal on node 49 is a serial data output corresponding to the data code formed polling the address lines coupled to the programmable paths of the identification circuit 45.

The identification signal output at node 49 is coupled to a thermal resistor RT1, which forms a resistor divider with a pull-up resistor (not shown in FIG. 9) between $V_{CC}$ and ground. The value of the thermal resistor is set to provide a suitable voltage ratio, as explained below. A typical example of desirable values for the thermal resistor and pull-up resistor are 422 ohms each. The 422 ohm value is standard for a 1% resistor, but other values can be used for each resistor, and the resistor values need not be the same. For $V_{CC}$ equal to five volts and resistance values being equal, however, the ratio of resistor values sets a nominal voltage at node 49 of 2.5 volts. Analog information relating to the printhead temperature and digital information relating to the identification code are multiplexed together in order that an additional interconnect pad is not needed. The output signal at node 49 provides analog temperature information within a first voltage range of about two volts at 0° C. to about four volts at 100° C. The same output node provides an output identification signal in response to the polling of the address lines 48A within a second voltage range. Output node 49 falls to about one volt or less when an address line $A_N$ is polled and the corresponding programmable path has been previously programmed to form a connection to the gate of the associated transistor $Q_N$. The one volt signal can therefore be used as a logic zero. If the programmable path has been previously programmed to form an open circuit, the preexisting analog temperature voltage does not change. The two to four voltage temperature voltage can therefore be used as a logic one.

Figure 10:
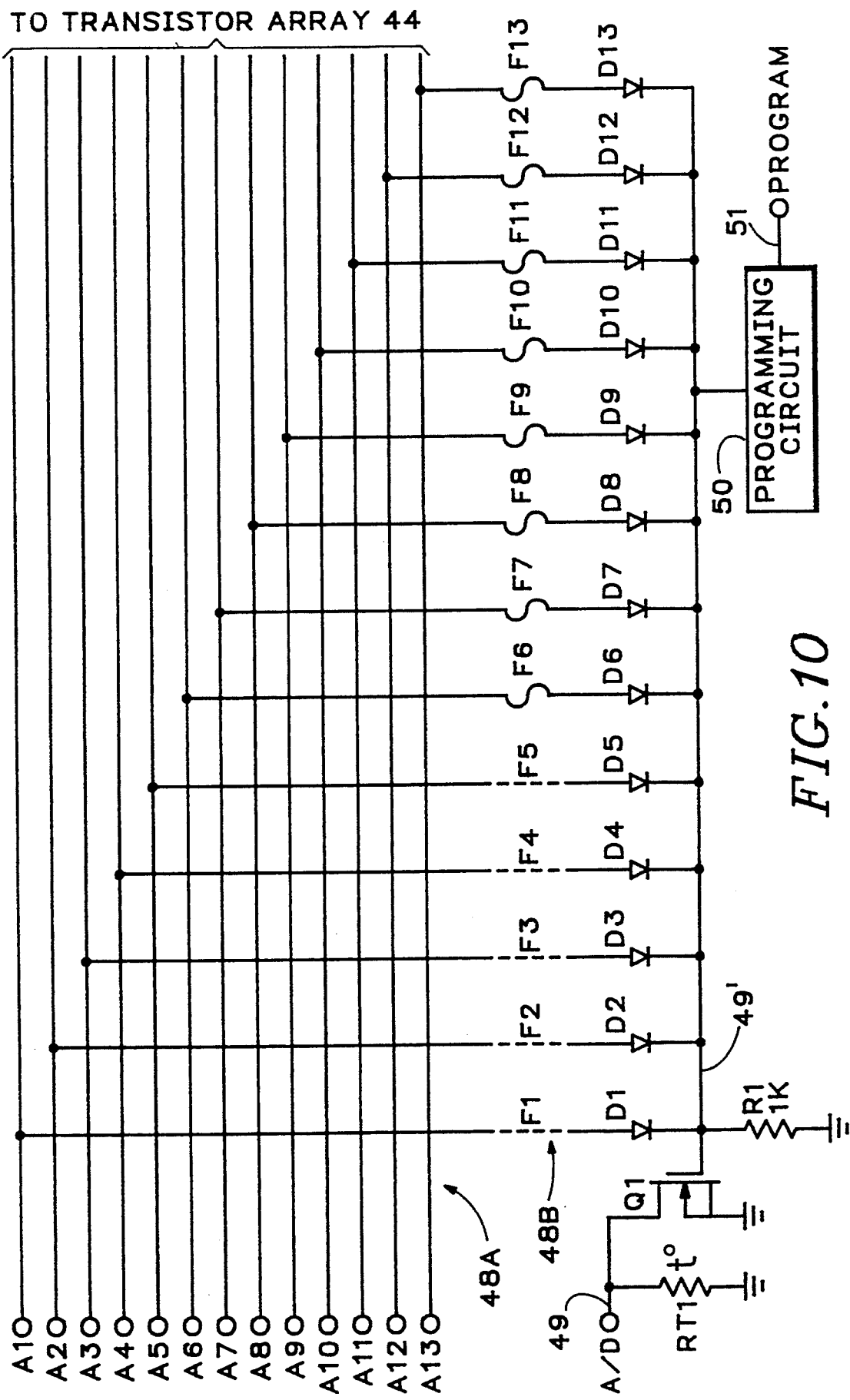

An alternative embodiment of the identification circuit 45 is shown in FIG. 10, wherein the active device in the programmable path is a diode. In this embodiment, the output portion of the identification circuit includes a resistor R1 and field-effect transistor Q1 coupled to the common node 49'. Resistor R1 is desirably a polysilicon resistor having a value of 1K ohms, but can be made in a manner suitable to an integrated circuit process such as NiCr resistors or self-biased FETs. A signal voltage is developed across resistor R1 in response to current flow through any of the diodes D1–D13 that are programmably coupled to the address lines. The signal voltage is in turn coupled to the gate of the transistor Q1. Transistor Q1 turns on and off in response to current flow in the programmable paths in a similar fashion to the transistors Q1–Q13 as described in the embodiment of FIG. 9. Diodes D1–D13 are necessary for current steering. A programming circuit 50 having a single programming transistor and a single pulldown transistor has an input 51 for receiving the PROGRAM input signal and a single output coupled to common node 49'.

Figure 11:
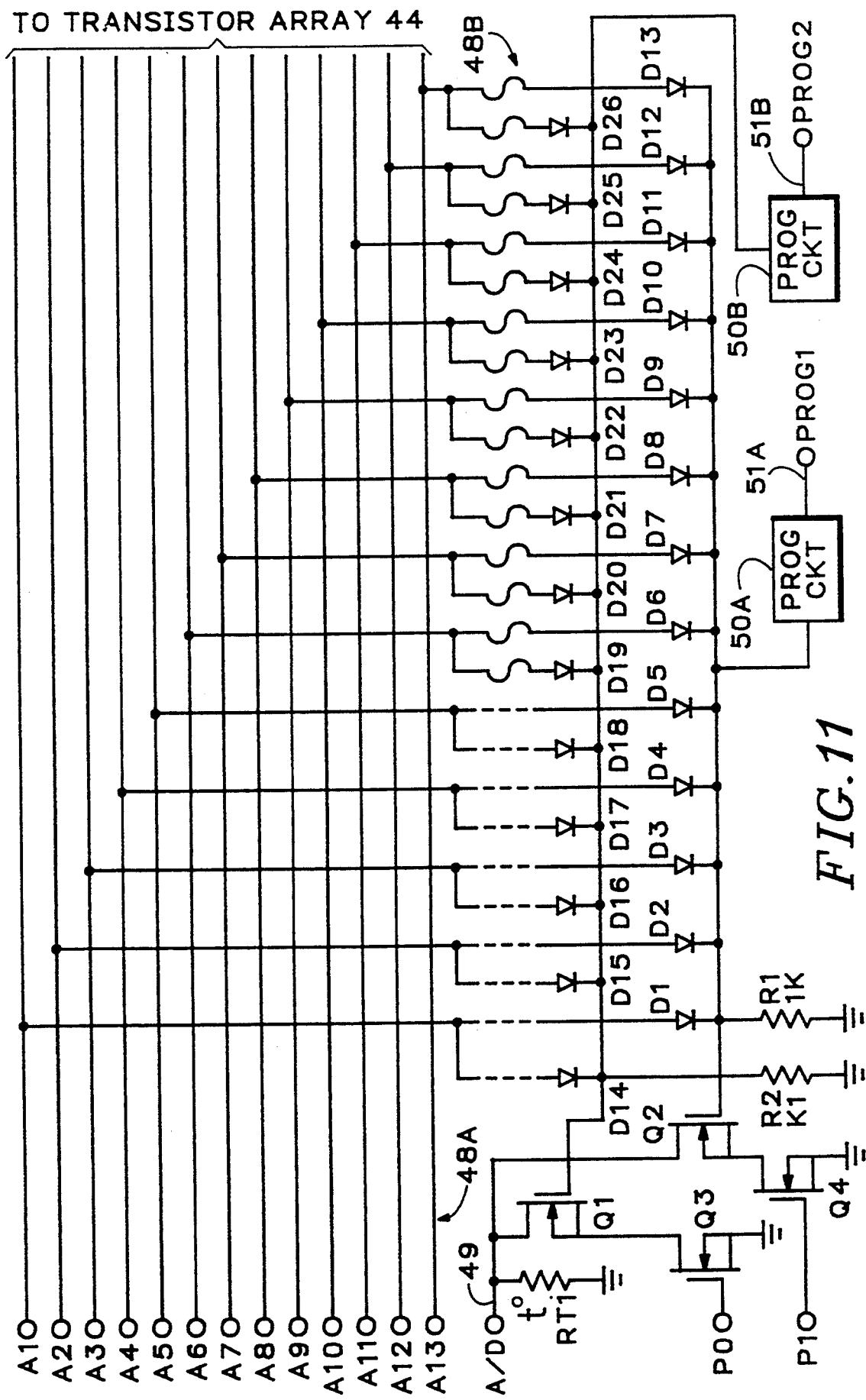

Another alternative embodiment of identification circuit 45 is shown in FIG. 11. This embodiment is similar to the embodiment of FIG. 10, except that two programmable paths are used for each address line. For example, a programmable path that includes diode D13 and D26 is coupled to address line A1. The embodiment of FIG. 11 is desirable if more bits are needed in the identification signal. Rather than a single output transistor, the identification circuit 45 of FIG. 11 includes transistors Q1 and Q2, the gate of which is coupled to a respective row of diodes. The drains of transistors Q1 and Q2 are coupled together to form a single output that is multiplexed with the analog temperature information at node 49. The source of transistors Q1 and Q2 are respectively coupled to the drain of transistor Q3 and Q4. Primitive signals P0 and P1 turn on either transistor Q3 or Q4, and thus enable either transistor Q1 or transistor Q2 to pass the identification signal to the output node 49. In order not to damage the resistors in the resistor array, is desirable that the pulse width of the primitive signals P0 and P1 not be extended beyond the normal pulse width. Separate programming circuits 50A and 50B are provided to program each set of transistors.

With respect to each of the embodiments shown in FIGS. 9–11, the fuses are programmed according to a predetermined pattern. Part of the pattern can be programmed at preassembly (through mask programmable fuses) to identify the print cartridge and part of the pattern can be programmed after the print cartridge is assembled (through integrated current programmable fuses) to provide compensation information to the controller. Programming the fuses includes the step of forming an open-circuit path between an address line and an active device in response to a logic high signal impressed on the selected address line and a current pulse from a programming circuit. A short-circuit path remains coupled to the unselected address lines.

Once the predetermined pattern of short and open circuit paths is programmed into the identification circuit, each row line can be polled to ascertain the identification data. If the primitive connections to the resistor array circuit are disconnected or the primitive voltage pulses are not used, no power is consumed in the resistor array and the address polling pulses can be as long as desired. Otherwise, short address polling pulses are desirably used that are not of sufficient duration to cause significant heating in the resistor array. The polling of the row lines causes a signal current to flow through the programmable paths that are programmed in a first logic state (short circuit) and no current to flow through the programmable paths that are programmed in a second logic state (open circuit). The signal currents of the programmable paths are combined to form a single serial output identification signal. If desired, the output identification signal can be multiplexed onto an existing interconnection pad of the printhead, such as the thermal resistor divider circuit described above.

Having described and illustrated the principles of the invention in a preferred embodiment thereof, it is apparent to those skilled in the art that the invention can be modified in arrangement and detail without departing from such principles. For example, while certain types of materials and component values have been specified, it is apparent to those skilled in the art that other types of suitable materials and component values may be used, depending upon the application requirements. Also, while a certain number of address lines and programmable paths have been shown, any number may be used. The ratio of mask programmable fuses to current programmable fuses can also be changed. The fuses may be integrated onto the array circuit 44 or imbedded in the flex circuitry, if desired. While a specific programming circuit has been shown, other such programming circuits are possible to provide the additional current programming pulse. The programming circuit may be eliminated entirely, and non-current programmed fuses such as laser ablated fuses may be used. Also, fuses may be omitted during the fabrication process and connections created or grown as needed. We therefore claim all modifications and variation coming within the spirit and scope of the following claims.

We claim:

1. An integrated circuit for use in thermal ink jet printheads for providing identifiable characteristics of individual print cartridges containing such a printhead to a printhead controller, comprising:
    an array circuit heating an ink reservoir to produce a pattern of ink jets, the array circuit including a plurality of resistor cells arranged in a predetermined number of rows and columns;
    a plurality of row and column lines coupled to the array circuit for selectively driving at least one of the resistor cells; and
    an identification circuit including a plurality of programmable paths, at least one of the programmable paths corresponding and coupled to each row line at a first end of the programmable paths and coupled at a second end of the programmable paths to a common node.

2. A circuit as in claim 1 in which the identification circuit further comprises an output means having an input coupled to the common node and an output for providing an output signal in response to a polling of the row lines by said printhead controller.

3. A circuit as in claim 2 in which the output means comprises:
    a resistor coupled to the common node; and
    a transistor having a control node coupled to the common node and a controlled node forming the output.

4. A circuit as in claim 3 in which the output is coupled to a thermal resistor divider, wherein
    the output provides circuit temperature information within a first voltage range and the output provides an output signal in response to the polling of the address lines within a second voltage range.

5. A circuit as in claim 1 in which the programmable paths each comprise the serial combination of a programmable fuse and an active device.

6. A circuit as in claim 5 in which the programmable fuse is selected from the group consisting of a fusible polysilicon link, a fusible NiCr link, and a fusible metal link.

7. A circuit as in claim 5 in which the active device comprises a diode.

8. A circuit as in claim 5 in which the active device comprises a field-effect transistor.

9. A circuit as in claim 1 in which the resistor cells further comprise a field-effect transistor for controlling current flow through the resistor cell.

10. An integrated circuit for use in thermal ink jet printheads for providing identifiable characteristics of individual print cartridges containing such a printhead to a printhead controller, comprising:
   an array circuit for heating an ink reservoir to produce a pattern of ink jets, the array circuit including a plurality of actively controlled resistor cells arranged in a predetermined number of rows and columns;
   a plurality of row and column lines coupled to the array circuit for selectively driving at least one of the resistor cells;
   an identification circuit including a plurality of programmable paths, a first end of each programmable path being coupled to a respective row line, a second end of each programmable path being coupled together to form a common node; and
   an output means having an input coupled to the common node and an output for providing an output signal in response to a polling of the row lines, the output signal being multiplexed onto an existing interconnect pad of the printhead.

11. A method for identifying characteristics of an integrated circuit thermal ink jet printhead, having an array circuit for heating an ink reservoir to produce a pattern of ink jets, the array circuit including a plurality of resistor cells arranged in a predetermined number of rows and columns and a plurality of row and column lines coupled to the array circuit for selectively driving at least one of the resistor cells, the method comprising the steps of:
   providing at least one programmable path coupled to each row line; and
   programming the programmable paths according to a predetermined pattern indicative of the characteristics of the printhead by:
      (a) forming a short-circuit path in response to a first logic state for passing a signal current; and
      (b) forming an open-circuit path in response to a second logic state for blocking the flow of a signal current.

12. The method of claim 11 further comprising the steps of:
   polling each row line, the polling causing a signal current to flow through the programmable path in a first logic state and no current to flow through the programmable path in a second logic state; and
   combining the signal currents of the programmable paths to form a single output identification signal.

13. The method of claim 12 further comprising the step of multiplexing the output identification signal onto an existing interconnection pad of the printhead.

14. The method of claim 12 further comprising the steps of:
   providing a thermal resistor divider for generating an analog voltage related to temperature at an interconnection pad within a first voltage range; and
   coupling the output identification signal to the interconnection pad for providing an identification signal within a second voltage range.

15. The method of claim 11 further comprising the steps of:
   coupling a first programmable path to each row line to form a first group of programmable paths; and
   coupling a second programmable path to each row line to form a second group of programmable paths.

16. The method of claim 15 further comprising the steps of:
   programming the programmable paths according to a predetermined pattern;
   polling each row line, the polling causing a signal current to flow through the programmable path in a first logic state and no current to flow through the programmable path in a second logic state;
   combining the signal currents of the programmable paths in the first group to form a first output identification signal; and
   combining the signal currents of the programmable paths in the second group to form a second output identification signal.

17. The method of claim 16 further comprising the step of multiplexing the first and second output identification signals to form a single output identification signal.

* * * * *